(12) United States Patent
Althaus et al.

(10) Patent No.: US 10,197,095 B2
(45) Date of Patent: Feb. 5, 2019

(54) HYDRODYNAMIC PLAIN BEARING

(71) Applicant: VOITH PATENT GMBH, Heidenheim (DE)

(72) Inventors: Josef Althaus, Fischen (DE); Ulrich Kempter, Burgberg (DE); Andreas Fuchs, Pfronten-Ried (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 15/111,882

(22) PCT Filed: Jan. 13, 2015

(86) PCT No.: PCT/EP2015/050498
§ 371 (c)(1),
(2) Date: Jul. 15, 2016

(87) PCT Pub. No.: WO2015/107048
PCT Pub. Date: Jul. 23, 2015

(65) Prior Publication Data
US 2016/0333929 A1 Nov. 17, 2016

(30) Foreign Application Priority Data

Jan. 15, 2014 (DE) .......................... 10 2014 200 594

(51) Int. Cl.
*F16C 17/02* (2006.01)
*F16C 32/06* (2006.01)
*F16C 33/10* (2006.01)

(52) U.S. Cl.
CPC ........ *F16C 32/0659* (2013.01); *F16C 17/022* (2013.01); *F16C 17/028* (2013.01); *F16C 32/0655* (2013.01); *F16C 33/1075* (2013.01)

(58) Field of Classification Search
CPC .. F16C 17/022; F16C 17/028; F16C 32/0651; F16C 32/0655; F16C 32/0659; F16C 33/1065; F16C 33/107; F16C 33/1075
See application file for complete search history.

(56) References Cited

U.S. PATENT DOCUMENTS

| | | | |
|---|---|---|---|
| 2,901,297 A | 8/1959 | Sternlicht | |
| 3,168,358 A * | 2/1965 | Buske | F16C 33/06 |
| | | | 29/898.042 |

(Continued)

FOREIGN PATENT DOCUMENTS

| | | |
|---|---|---|
| AT | 510062 A1 | 1/2012 |
| CH | 375956 A | 3/1964 |

(Continued)

*Primary Examiner* — James Pilkington
(74) *Attorney, Agent, or Firm* — Laurence A. Greenberg; Werner H. Stemer; Ralph E. Locher

(57) ABSTRACT

A hydrodynamic plain bearing has a bearing shell with an inner surface forming a bearing surface for a rotating shaft or the like. The bearing surface, in order to form a bearing having a multi-wedge bore, has a plurality of surface segments arranged one after the other in the circumferential direction and each forming a circle segment having a radius R by way of the inner circumference of the surface segments. The center point of the circle segment of each surface segment is shifted relative to a center point of the bearing shell by an eccentricity. The bearing shell has two halves, each extending over 180° of the bearing surface and joined in a joint plane. At least one surface segment is offset from the center point of the bearing shell along an offset plane at an angle to the joint plane in the circumferential direction of the bearing shell.

17 Claims, 5 Drawing Sheets

(56) References Cited

U.S. PATENT DOCUMENTS

| | | | | |
|---|---|---|---|---|
| 3,201,183 A | * | 8/1965 | Buske | F16C 33/06 384/286 |
| 3,625,580 A | * | 12/1971 | Dehart | F16C 9/04 384/288 |
| 3,722,965 A | | 3/1973 | Gemein et al. | |
| 3,743,367 A | | 7/1973 | Raimondi | |
| 4,307,921 A | * | 12/1981 | Roberts | F16C 9/04 384/399 |
| 4,311,349 A | * | 1/1982 | Roberts | F16C 9/04 384/286 |
| 4,580,911 A | | 4/1986 | Burkhard et al. | |
| 4,834,559 A | | 5/1989 | Kalvoda | |
| 5,009,522 A | * | 4/1991 | Hahn | F16C 9/02 384/273 |
| 6,056,509 A | | 5/2000 | Nakayama et al. | |
| 7,234,870 B2 | * | 6/2007 | Kitahara | F16C 9/02 384/288 |
| 8,783,954 B2 | | 7/2014 | Garnier | |
| 2010/0119181 A1 | | 5/2010 | Ishigo et al. | |
| 2010/0166347 A1 | | 7/2010 | Wendling | |

FOREIGN PATENT DOCUMENTS

| | | |
|---|---|---|
| DE | 2103239 A1 | 8/1972 |
| DE | 3426559 A1 | 1/1986 |
| DE | 69529432 T2 | 10/2003 |
| DE | 102011005467 A1 | 9/2012 |
| FR | 1388194 A | 2/1965 |
| RU | 2013672 C1 | 5/1994 |

\* cited by examiner

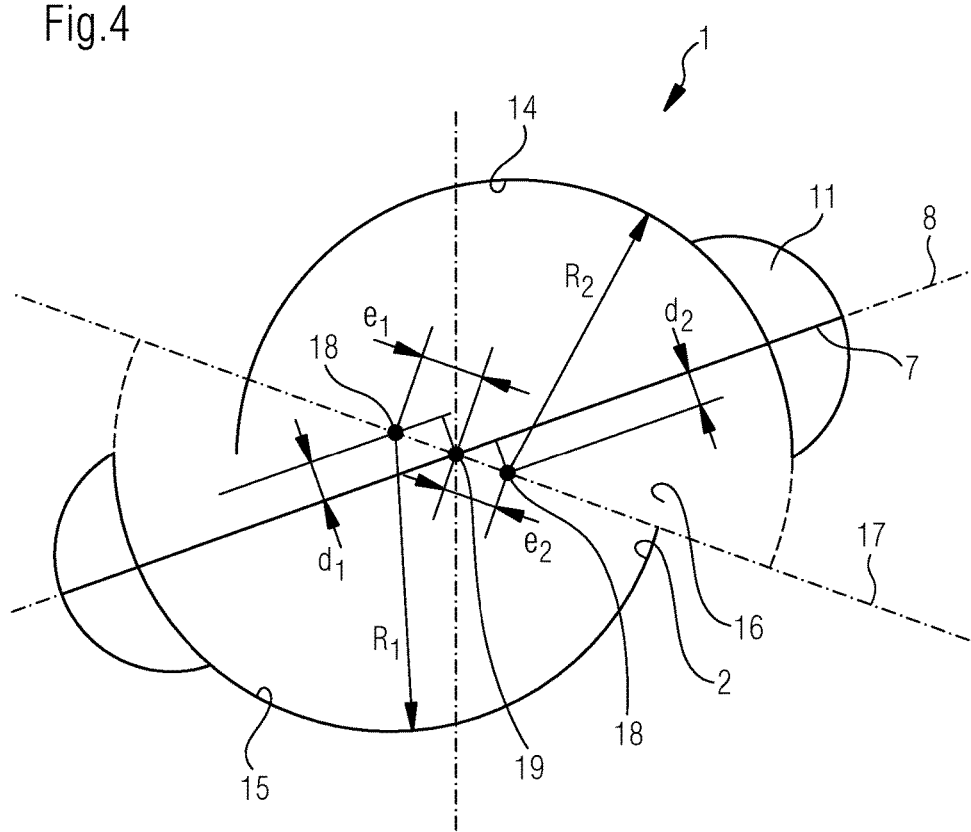

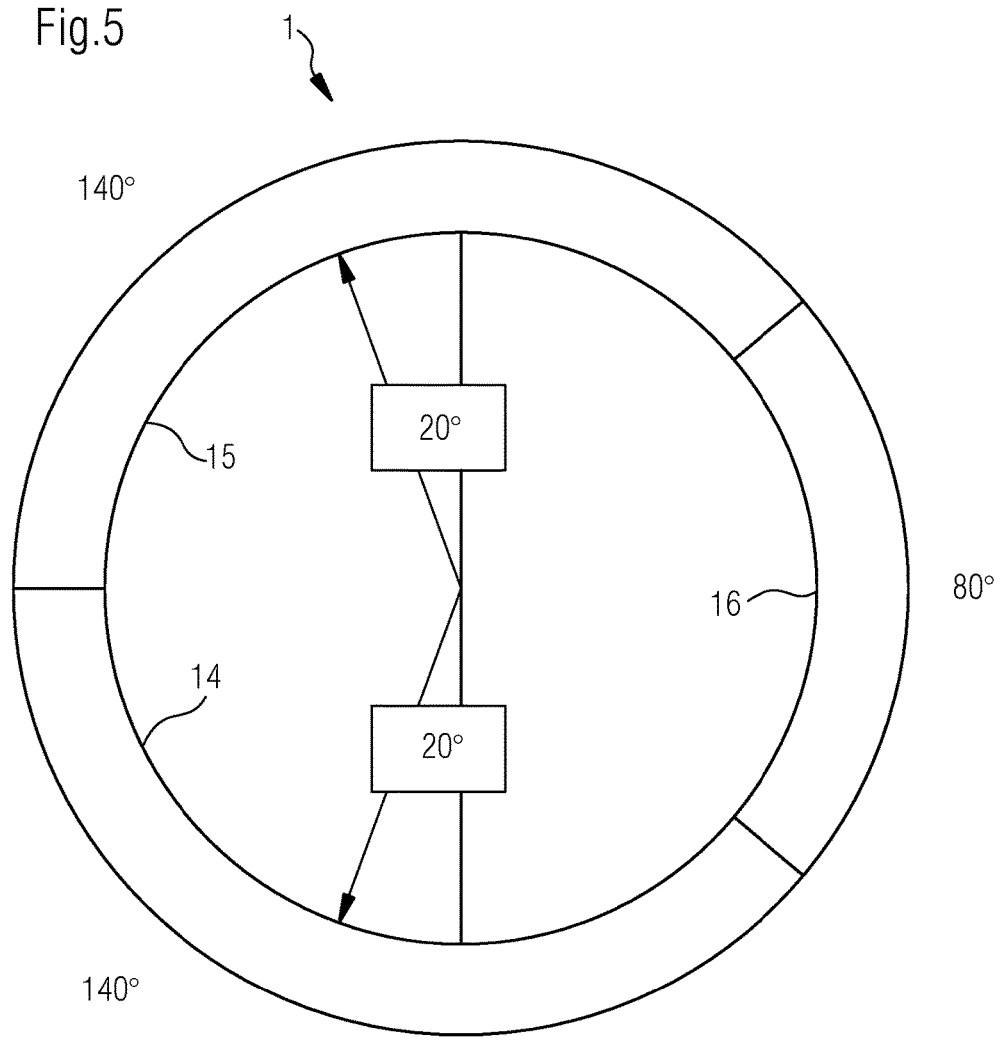

HYDRODYNAMIC PLAIN BEARING

BACKGROUND OF THE INVENTION

Field of the Invention

The present invention relates to a hydrodynamic plain bearing, which is embodied as what is known as a bearing having a multi-wedge bore.

Hydrodynamic plain bearings of this type, which are generally embodied as radial bearings having a multi-wedge, but can also be embodied as radial axial bearings with a multi-wedge bore, have a multiplicity of surface segments of the bearing surface arranged in succession in the circumferential direction of the bearing shell, which bearing surface, together with the outer surface, which is circular in cross-section, of the shaft to be supported, the journal to be supported, or the like, forms a converging gap or converging gaps in order to form supporting pressures in the lubricating gap in the unloaded or low-load state, which pressures center the shaft. A radial bearing with multi-wedge bore is, for example, what is known as an oval clearance bearing, also referred to as a bearing having a two-wedge bore, in which the bearing surface has two surface segments, the inner circumference of each of said surface segments forming a segment of a circle having a radius R, wherein the center point of each segment of a circle that is shifted relative to a center point of the bearing shell by an eccentricity, also referred to as a production eccentricity. The shift is provided here in opposite directions, such that, for example within a vertical plane through the center point of the bearing shell, the two segments of a circle are pushed toward one another by twice the eccentricity. This results in a bearing gap between the outer surface of the shaft and the inner bearing surface of the bearing shell which widens increasingly starting from the plane of the offset in the circumferential direction to a plane perpendicularly hereto.

Reference is also made here to a profiling of the bearing, wherein the profiling is defined as the difference between the specified radius R of the surface segments and the outer radius of the shaft, standardized with or divided by the outer radius of the shaft. Instead of the outer radius of the shaft, the radius of a circle fitted into the bearing surface can also be used as reference radius.

Conventional oval clearance bearings have the disadvantage of a heavily orthotropic dynamic property, i.e. although they have a high rigidity and a high bearing damping in the direction of primary load, they have a much lower bearing rigidity and damping in deviating directions.

BRIEF SUMMARY OF THE INVENTION

The object of the present invention is to specify a hydrodynamic plain bearing having the design of a multi-wedge bore, of which the orthotropic dynamic properties are less pronounced and which has an improved relative bearing damping, that is to say an improved damping with respect to the rigidity.

The object according to the invention is achieved by a hydrodynamic plain bearing as claimed. Advantageous and particularly expedient embodiments of the invention are specified in the dependent claims.

The hydrodynamic plain bearing according to the invention is embodied as an offset multi-wedge bore bearing. Accordingly, the surface segments shaped as segments of a circle are shifted only via their center point, based on the radius R of a particular segment of a circle, relative to the center point of the bearing shell, through which the longitudinal axis of the bearing shell extends, as is the case for example in oval clearance bearings, but at least one surface segment is also shifted relative to the center point of the bearing shell by an offset e along an offset plane, such that at least two surface segments are shifted relative to one another, or a first surface segment is shifted relative to a group of further surface segments, or a first group of surface segments is shifted relative to a second group of surface segments, along this offset plane.

By way of example, a much lower profiling can be achieved as a result compared with a conventional oval bearing, and the relative bearing damping is improved. At the same time, orthotropic dynamic properties decrease.

More specifically, a hydrodynamic plain bearing according to the invention has a bearing shell having an inner surface, which forms a bearing surface for a circumferential shaft or the like. Instead of a circumferential shaft, another component having a generally cylindrical outer surface can also be received in the bearing shell, with formation of a bearing gap, for example a journal of rotating construction.

The bearing surface, in order to form a bearing having what is known as a multi-wedge bore, is provided with a multiplicity of surface segments arranged in succession in the circumferential direction of the bearing shell. In a cross-section through the longitudinal axis of the bearing shell, the surface segments each form, on their inner surface, a segment of a circle having a radius R, of which the center point is shifted relative to a center point of the bearing shell by an eccentricity d. The production of a bearing surface of this type can be imagined in that sectors are cut out and removed from a circle having the radius R, and the remaining segments are pushed toward one another, until they contact one another at their ends via a sort of angular deflection, discontinuity or a buckling and are positioned on a circle having a smaller radius. This circle is the fitted circle mentioned in the introduction having the reference radius. Instead of the description with a segment of a circle in cross-section through the longitudinal axis of the bearing shell, the surface segments can also be referred to as cylinder segments.

In accordance with the invention, the bearing shell has two bearing shell halves, which are each formed in one or more parts and which each extend over 180° of the bearing surface and are joined at a joint extending within a joint plane.

In accordance with the invention, at least one surface segment is additionally offset relative to the center point of the bearing shell by an offset e along an offset plane, wherein the offset plane is at an angle to the joint plane in the circumferential direction of the bearing shell.

A multiplicity of oil bores are advantageously formed in the bearing shell, which extend at least in part or completely in the radial direction and produce an oil-conducting connection between the outer circumference of the bearing shell and the bearing surface. By way of example, an oil bore is provided on each of the opposite sides of the bearing surface, said oil bores therefore being arranged opposite in the circumferential direction, wherein these two oil bores extend along the joint in the joint plane.

It is favorable when one, more or all oil bores have an outlet in the bearing surface, which outlet is surrounded by a lubrication pocket formed in the bearing surface. By way of example, the oil bore or each oil bore opens out, in the circumferential direction of the bearing surface, in a center of the lubricating pocket surrounding said bore.

In accordance with an embodiment of the invention, the offset plane or each offset plane is positioned outside the lubrication pocket of the oil bores extending along the joint.

In accordance with an embodiment of the invention, provision is made for precisely three oil bores to be provided in succession over the circumference of the bearing surface. This does not rule out the fact that two or more oil bores are provided adjacently at a common circumferential angle.

By way of example, the bearing surface has a (first) surface segment having a circumferential angle of 180° The two circumferential ends of this surface segment may then lie for example in the offset plane. It is favorable if a second surface segment also has a circumferential angle of 110° to 140°, in particular of 130° to 120°, and a third surface segment has a circumferential angle of 40° to 70°, in particular of 50° or 60°. The second and the third surface segment can then be shifted jointly along the offset plane relative to the first surface segment.

The offset plane may be the sole provided offset plane. An angle in the circumferential direction between the joint and the offset plane may be 20° to 60°, for example.

The eccentricities d between the center point of a particular segment of a circle and the center point of the bearing shell are, for example, perpendicular to the joint plane, as will become clear later from the description of the drawings. One or more oil groove(s) extending in the circumferential direction can be provided in the bearing surface, said groove/grooves extending in particular only over part of the width of the bearing surface, as considered in the axial direction of the bearing shell, wherein the width of the oil grooves is in particular smaller than the width of the lubrication pockets.

In accordance with an embodiment, provision is made for what is known as a pressure dam to be formed by at least one such oil groove, that is to say a protrusion in the radial direction of the bearing shell on the bearing surface, against which the oil flows as the shaft rotates.

The invention will be described by way of example hereinafter on the basis of an exemplary embodiment and the drawings.

In the drawings:

BRIEF DESCRIPTION OF THE SEVERAL VIEWS OF THE DRAWING

FIG. 4 shows a considerably exaggerated schematic view of the offset of the surface segments relative to the center point of the bearing shell;

FIG. 5 shows a further exemplary embodiment of a hydrodynamic plain bearing according to the invention having a different segment division.

DESCRIPTION OF THE INVENTION

Figure 1:
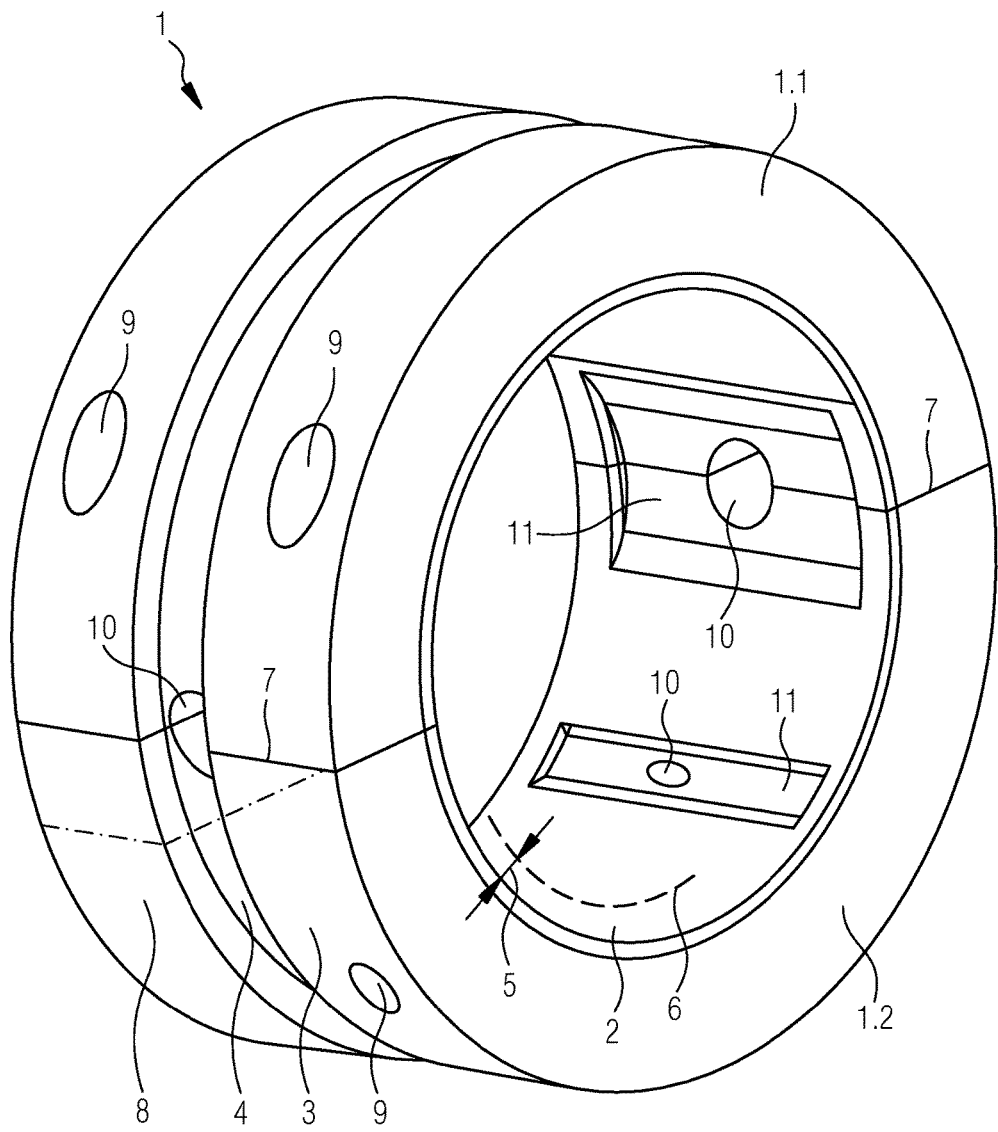
FIG. 1 shows an exemplary oblique plan view of a hydrodynamic plain bearing according to the invention.

In FIG. 1, an exemplary embodiment of a hydrodynamic plain bearing according to the invention is illustrated, having a bearing shell 1, which on its inner circumference forms a bearing surface 2 and which has an outer circumference 3, which here is substantially cylindrical, having an annular channel 4 formed therein for supplying lubricating oil and/or cooling oil to the bearing gap 5, which is formed between the bearing surface 2 and the outer circumference of a shaft 6, which is indicated here merely schematically and is supported by the hydrodynamic plain bearing.

The bearing shell 1 consists in the shown exemplary embodiment of two bearing shell halves 1.1, 1.2, which each extend over 180° of the bearing surface 2 or of the outer circumference 3 and are joined at a joint 7, which extends in a joint plane 8. The two bearing shell halves 1.1, 1.2 are screwed to one another for example via screws 9.

Three oil bores 10 are formed in the radial direction of the bearing shell 1 and produce an oil-conducting connection between the outer circumference 3 and the bearing surface 2. The outlet of each oil bore 10 in the bearing surface 2 is surrounded by a lubrication pocket 11, which is formed as a recess in the bearing surface 2. The oil bores 10 open out in the annular channel 4 on the outer circumference 3.

Figure 2:
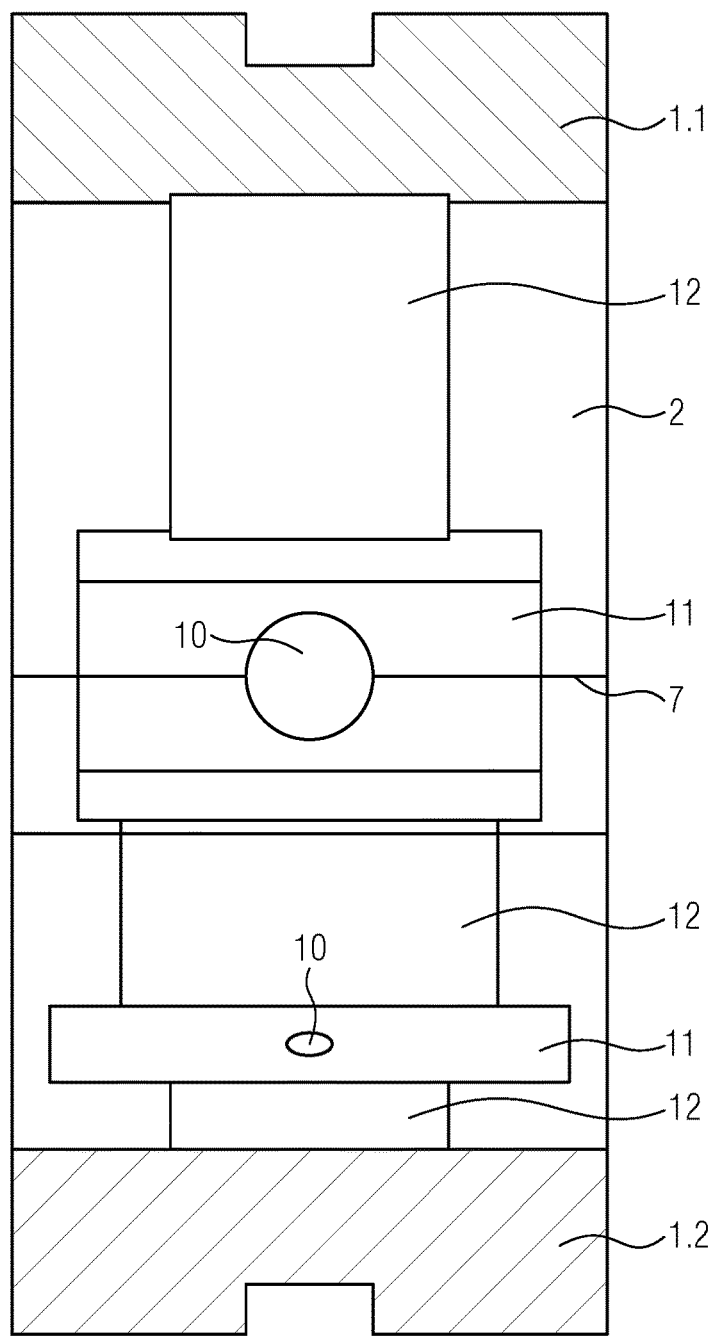
FIG. 2 shows a schematic partially sectional view of the bearing surface of the bearing from FIG. 1.

In FIG. 2 a plan view from the inside onto the bearing surface 2 is illustrated. Besides the lubrication pockets 11, also visible in FIG. 1, with the oil bores 10, oil grooves 12 formed in the bearing surface 2 can be seen, which extend in the circumferential direction over part of the width (which corresponds to the axial direction of the bearing). The oil grooves 12 can have a different width relative to one another and/or relative to the lubrication pockets 11. However, this is not compulsory. The oil grooves 12 can each extend starting from a first lubrication pocket 11 as far as a second lubrication pocket 11, however this likewise is not compulsory. The oil bores 10 can in particular have different diameters, for example the oil bores 10 positioned within the joint 7 have a larger diameter than the remaining oil bore 10, which however then opens out in particular in a lubrication pocket 11 having the comparatively greatest axial width. In particular, the comparatively widest oil groove 12 is provided between this lubrication pocket 11 and the lubrication pocket 11 following in the circumferential direction in the direction of rotation of the shaft 6, as is illustrated by way of example in FIG. 2.

Figure 3:
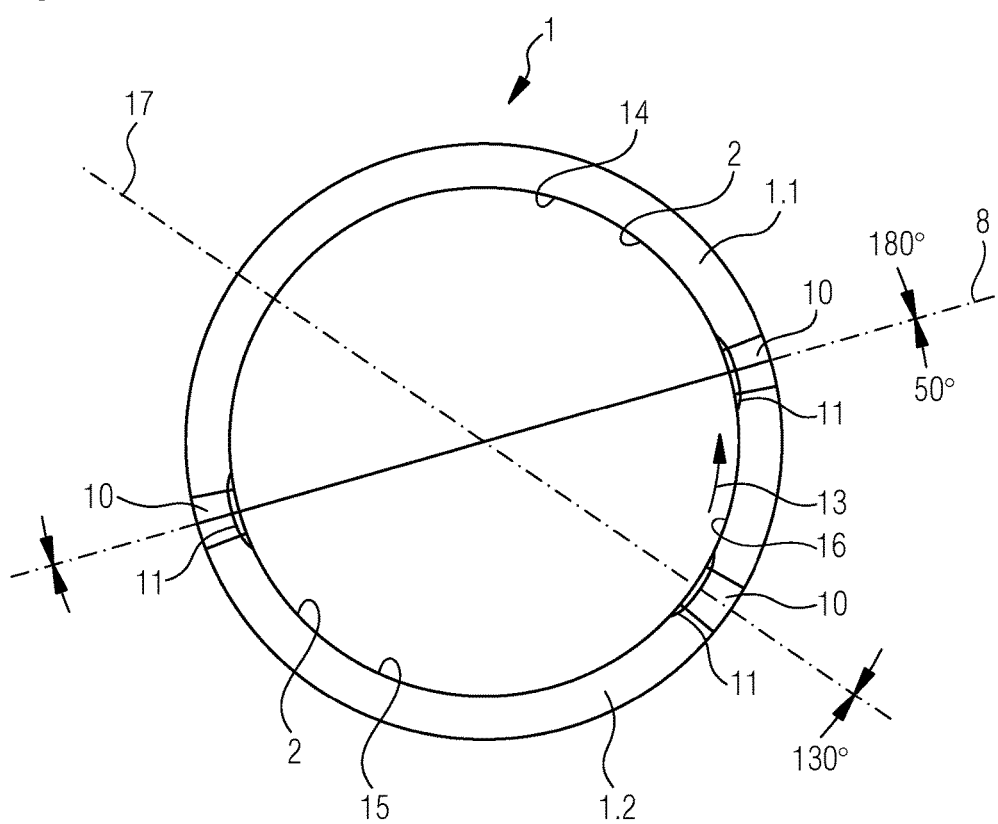
FIG. 3 shows a schematic illustration of the surface segmentation of the bearing surface of the bearing from FIGS. 1 and 2.

As can be seen from FIG. 3 in conjunction with FIG. 2, this comparatively widest lubrication pocket 12, for example as considered in the direction of rotation of the shaft 6 (FIG. 1), which is indicated in FIG. 3 by the arrow 13, is positioned before or at the start of the smallest surface segment, which in the present case is referred to as the third surface segment 16. This third surface segment 16 for example has, as illustrated in FIG. 3, a circumferential angle of 50°. The third surface segment 13 is followed in the direction of rotation 13 of the shaft 6 (illustrated in FIG. 1) by a first surface segment 14, which in the shown exemplary embodiment extends over a circumferential angle of 180°, and by a second surface segment 15, which in the shown exemplary embodiment extends over a circumferential angle of 130°.

In the exemplary embodiment illustrated here, the entire first bearing shell half 1.1 on the bearing surface 2 is formed by the first surface segment 14. The bearing surface 2 of the second bearing shell 1.2 is by contrast formed by the second surface segment 15 and the third surface segment 16.

It can be seen in the shown exemplary embodiment that an offset plane 17, which will be discussed in greater detail with reference to FIG. 4, is positioned at an angle to the joint plane 8, in particular is inclined hereto by 10° or 20° to 60°.

The first bearing shell 1.1, which is loaded to a lesser extent during operation, illustrated in FIG. 3 is profiled lower than the second bearing shell 1.2, which means that the surface segment radius (radius of the segment of a circle formed by the surface segment) is much greater than the reference radius, which for example is defined by the outer radius of the shaft 6 or by a radius of a circular ring theoretically fitted into the bearing surface 2. By way of example, the bearing shell half loaded to a lesser extent is three to five times more strongly profiled than the bearing shell half loaded to a comparatively greater extent.

In FIG. 4, the joint 7 with the joint plane 8 and the two lubrication pockets 11 (not illustrated to scale) in the joint plane 8 is illustrated again. Furthermore, the radius R of the surface segments or of the segment of a circle formed thereby on the inner side is plotted. The radius of a surface segment or of the surface segments 15, 16 is designated by $R_1$, and the radius of the other surface segment is designated by $R_2$. The center point of a particular segment of a circle (of both bearing shell halves 1.1, 1.2; see FIG. 3), which is referenced by 18, is shifted by an eccentricity d relative to the center point 19 of the bearing shell 1 and therefore also relative to the joint plane 8. At the same time, each center point 18 of the segments of a circle of the surface segment 14 or formed jointly by the second and the third surface segment 15, 16 is shifted by an offset e relative to the center point 19 of the bearing shell 1, more specifically within the offset plane 17. The offset e of the center point 18 has a value equal to or greater than a value of the offset e between the center point of the bearing shell and the surface segment. In accordance with the radii $R_1$, $R_2$, the offset of the surface segments 15, 16 is also designated by $e_1$ and the offset of the surface segment 14 is designated by $e_2$. The eccentricity $d_1$ of the second and third surface segment 15, 16 and the eccentricity $d_2$ of the first surface segment 14 are also referenced.

In FIG. 5 a further exemplary embodiment of a hydrodynamic plain bearing according to the invention is schematically illustrated. In this exemplary embodiment, three surface segments 14, 15, 16 arranged in succession in the circumferential direction of the bearing shell 1 and each forming a segment of a circle via their inner circumference are likewise provided, wherein, in contrast from the previous exemplary embodiment, two surface segments 14, 15 each extend over 140°, and the remaining surface segment 16 extends over 80°. In particular, the surface segments 14, 15 extending over 140° are profiled smaller than the surface segment 16 extending over 80°. It is thus possible for the surface segments 14, 15 extending over the greater angle to have a higher supporting force than the remaining surface segment 16, however this contributes particularly to the stability of the bearing. The bearing is suitable in particular for all operating points, such that there is no need to change the bearing. Oil bores or cooling bores can advantageously optionally be provided in the surface segments 14, 15 extending over 140°, but of course additionally or alternatively also in the remaining surface segment 16.

In the shown exemplary embodiment, two directions of primary load are plotted, which are angularly offset by 20° relative to a vertical. However, other directions of primary load could also be provided. The bearing is in particular equally suitable for both directions of rotation and by way of example can be provided as a bearing for a spur gear, wherein a pinion and/or a gearwheel, which mesh with one another, can be driven.

The joint is not shown in detail in the shown exemplary embodiment.

In particular, CuCr1Zr is a potential material for the hydrodynamic plain bearing shown here in the drawings or also for other plain bearings embodied in accordance with the invention.

The invention claimed is:

1. A hydrodynamic plain bearing, comprising:
 a bearing shell having an inner surface forming a bearing surface for a rotating shaft;
 said bearing surface being formed with a multiplicity of surface segments defining a bearing having a multi-wedge bore, said surface segments being arranged in succession in a circumferential direction of the bearing shell and each, by way of an inner circumference thereof, forming a segment of a circle having a radius R, a center point of a segment of a circle of each said surface segment being shifted relative to a center point of said bearing shell by an eccentricity d;
 said bearing shell having two bearing shell halves each extending over 180° of said bearing surface and being joined at a joint in a joint plane;
 at least one said surface segment being offset relative to the center point of said bearing shell by an offset e along an offset plane, wherein said offset plane defines an angle with said joint plane in the circumferential direction of said bearing shell, the angle in the circumferential direction between said joint plane and said offset plane lying between 10° and 60°.

2. The hydrodynamic plain bearing according to claim 1, wherein said bearing shell is formed with a multiplicity of oil bores that extend at least partially or completely in a radial direction and are configured to produce an oil-conducting connection between an outer circumference of said bearing shell and said bearing surface.

3. The hydrodynamic plain bearing according to claim 2, wherein an oil bore is provided on each of the opposite sides of the bearing surface, said oil bores extending along said joint in said joint plane.

4. The hydrodynamic plain bearing according to claim 2, wherein one, several, or all said oil bores are formed with an outlet in said bearing surface, said outlet being surrounded by a lubrication pocket formed in said bearing surface.

5. The hydrodynamic plain bearing according to claim 4, wherein said offset plane extends outside said lubrication pocket of said oil bores that extend along said joint.

6. The hydrodynamic plain bearing according to claim 4, wherein said oil bore or each said oil bore is positioned in the circumferential direction of the bearing surface in a center of a respective said lubrication pocket surrounding said oil bore.

7. The hydrodynamic plain bearing according to claim 1, wherein precisely three oil bores are provided over the circumference of said bearing surface.

8. The hydrodynamic plain bearing according to claim 1, wherein a surface segment has a circumferential angle of 180°.

9. The hydrodynamic plain bearing according to claim 8, wherein a second surface segment has a circumferential angle of 110° to 140° and a third surface segment has a circumferential angle of 40° to 70°.

10. The hydrodynamic plain bearing according to claim 9, wherein said second surface segment has a circumferential angle of 130° or 120° and said third surface segment has a circumferential angle of 50° or 60°.

11. The hydrodynamic plain bearing according to claim 9, wherein only one offset plane is provided and along said offset plane the one surface segment having a circumferential angle of 180° is offset by an offset having a value equal to or greater than a value of the offset e between the center point of the bearing shell and said surface segment relative to all other surface segments jointly, or relative to said second surface segment.

12. The hydrodynamic plain bearing according to claim 11, wherein the one surface segment having a circumferential angle of 180° is offset by an offset having a value equal to two times a value of the offset e between the center point of the bearing shell and said surface segment relative to all other surface segments jointly or relative to said second surface segment.

13. The hydrodynamic plain bearing according to claim 1, wherein the eccentricity d is perpendicular to said joint plane.

14. The hydrodynamic plain bearing according to claim 1, wherein:
- a first said surface segment has a circumferential angle of 180°, a second said surface segment has a circumferential angle of 110° to 140°, and a third surface segment has a circumferential angle of 40° to 70°; and
- only one offset plane is provided and along said offset plane said first surface segment is offset by an offset having a value equal to or greater than a value of the offset e between the center point of the bearing shell and said surface segment relative to all other surface segments jointly.

15. The hydrodynamic plain bearing according to claim 14, wherein said first surface segment is offset by an offset having a value equal to two times a value of the offset e between the center point of the bearing shell and said surface segment relative to all other surface segments jointly or relative to the second said surface segment.

16. A hydrodynamic plain bearing, comprising:
- a bearing shell having an inner surface forming a bearing surface for a rotating shaft;
- said bearing surface being formed with a multiplicity of surface segments defining a bearing having a multi-wedge bore, said surface segments being arranged in succession in a circumferential direction of the bearing shell and each, by way of an inner circumference thereof, forming a segment of a circle having a radius R, a center point of a segment of a circle of each said surface segment being shifted relative to a center point of said bearing shell by an eccentricity d;
- said bearing shell having two bearing shell halves each extending over 180° of said bearing surface and being joined at a joint in a joint plane;
- at least one said surface segment being offset relative to the center point of said bearing shell by an offset e along an offset plane, wherein said offset plane defines an angle with said joint plane in the circumferential direction of said bearing shell; and
- wherein a surface segment has a circumferential angle of 180°.

17. The hydrodynamic plain bearing according to claim 16, wherein a second surface segment has a circumferential angle of 110° to 140° and a third surface segment has a circumferential angle of 40° to 70°.

* * * * *